(12) United States Patent
Truskalo et al.

(10) Patent No.: US 6,268,706 B1
(45) Date of Patent: Jul. 31, 2001

(54) HORIZONTAL PARALLELOGRAM CORRECTION COMBINED WITH HORIZONTAL CENTERING

(75) Inventors: Walter Truskalo; Ronald Eugene Fernsler, both of Indianapolis, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/509,519

(22) PCT Filed: Oct. 10, 1997

(86) PCT No.: PCT/US97/18328

§ 371 Date: Mar. 29, 1999

§ 102(e) Date: Mar. 29, 1999

(87) PCT Pub. No.: WO99/20039

PCT Pub. Date: Apr. 22, 1999

(51) Int. Cl.[7] ............... G09G 1/04; H01J 29/70
(52) U.S. Cl. .................... 315/371; 315/395
(58) Field of Search ............... 315/371, 382, 315/395, 398, 408

(56) References Cited

U.S. PATENT DOCUMENTS

| 2,478,744 | 8/1949 | Clark | 315/406 |
|---|---|---|---|
| 2,637,832 | 5/1953 | Rogers | 315/398 |
| 2,795,734 | 6/1957 | Dietch | 315/398 |
| 3,683,231 | 8/1972 | Jagatic | 315/398 |
| 3,814,981 | 6/1974 | Rusk | 315/371 |
| 4,037,137 | 7/1977 | Dietz | 315/398 |
| 4,572,993 | 2/1986 | Haferl | 315/408 |
| 4,703,233 | 10/1987 | Rodriguez-Cavazos | 315/398 |
| 5,162,705 | 11/1992 | Golik | 315/382 |
| 5,691,609 | * 11/1997 | Park | 315/398 |
| 6,081,078 | * 6/2000 | Trusklo et al. | 315/371 |

FOREIGN PATENT DOCUMENTS

| 072595 | 2/1983 | (EP) | H04N/3/16 |
|---|---|---|---|
| 797350 | 9/1997 | (EP) | H04N/3/233 |
| 808058 | 11/1997 | (EP) | H04N/3/22 |

* cited by examiner

*Primary Examiner*—Don Wong
*Assistant Examiner*—Wilson Lee
(74) *Attorney, Agent, or Firm*—Joseph S. Tripoli; Harvey D. Fried; Sammy S. Henig (57) ABSTRACT

An electron beam tends to slope downwardly as it is deflected horizontally to form a raster in a video display apparatus. The sloping of the beam can cause geometric errors in the raster, for example orthogonality and parallelogram errors. A raster correction circuit substantially offsets the downward slope of the electron beam by modulating a vertical deflection current with an induced horizontal-rate raster correction current, thereby substantially eliminating orthogonality and parallelogram errors in the raster. A raster correction transformer utilizes a raster centering inductor for a primary winding, and a horizontal-rate centering current is magnetically coupled into the vertical deflection coils to modulate the vertical deflection current.

8 Claims, 6 Drawing Sheets

FIG. 10 ated in FIG. 1.
HORIZONTAL PARALLELOGRAM CORRECTION COMBINED WITH HORIZONTAL CENTERING

BACKGROUND

This invention relates generally to the field of raster correction circuits, and, in particular, to correction of orthogonality and parallelogram errors in a raster of a cathode-ray tube of a video display apparatus.

A deflection system utilized in a video display apparatus, such as a television receiver or a video display monitor, typically includes circuitry that allows for the adjustment of a raster on the viewing screen of the apparatus's cathode-ray tube. Such circuitry is required because of, among other things, the nature of the scanning process and the geometry of the cathode-ray tube.

Figure 1:
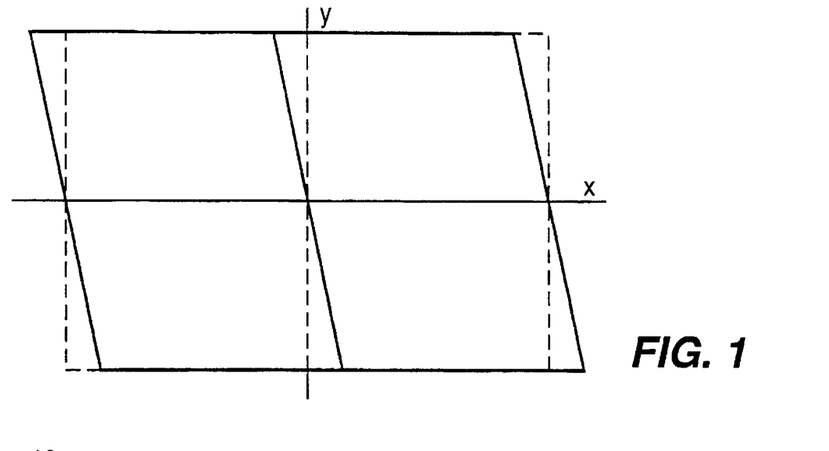
FIG. 1 is useful for explaining orthogonality and parallelogram errors in a raster.

For example, such circuitry may include a raster correction circuit for eliminating orthogonality and parallelogram errors in the scanned raster. The nature of the orthogonality and parallelogram errors and an approach to eliminating both of them is described in a U.S. patent application entitled "VERTICAL DEFLECTION CIRCUIT WITH RASTER CORRECTION", which was filed on May 17, 1996, in the name of Walter Truskalo et al., and was assigned Ser. No. 08/649,409. That application discloses an arrangement for modulating a vertical deflection current at a horizontal rate for substantially offsetting a downhill scan effect caused by vertical deflection of the electron beam, thereby correcting orthogonality and parallelogram errors in the raster. A raster subject to orthogonality and parallelogram errors is illustrated in FIG. 1.

Such circuitry may also include a centering circuit for, illustratively, horizontally centering the raster on the viewing screen of the tube. Centering the raster is necessary to ensure the most efficient use of the tube, which occurs when the size of the scanned raster is substantially the same size as the tube's viewing screen. The need for horizontal centering is most pronounced when the amount of horizontal overscan is reduced or, in other words, when the size of the scanned raster is reduced to the size of the tube's viewing screen. Centering the raster is typically accomplished by causing a direct current of selected polarity and amplitude to flow through the appropriate deflection coils, either horizontal or vertical.

In the manufacture of a video display apparatus, it is desirable to consolidate circuitry to the greatest possible extent. Such consolidation provides several advantages, among them: decreased parts count, decreased cost, increased reliability, and an increase in the amount of space available within the apparatus's chassis. Accordingly, it is desirable to consolidate the circuits that perform the raster correction and centering functions.

SUMMARY

The present invention is directed to a deflection system that satisfies the need to consolidate circuitry in a video display apparatus to the greatest possible extent.

A deflection system according to the inventive arrangements taught herein comprises a vertical deflection coil for deflecting the scanning electron beam between upper and lower edges of the raster; a raster centering circuit, which has a centering inductor, for centering the raster on the screen; and a raster correction transformer. The raster correction transformer uses the centering inductor for a primary winding and has a secondary winding coupled to the vertical deflection coil. The centering inductor and the secondary winding are advantageously wound around the same core.

The vertical deflection coil may comprise first and second vertical deflection windings coupled in either a series or a shunt arrangement.

It is advantageous to use the centering inductor as the primary winding of the raster correction transformer because then the vertical deflection circuit and the raster centering circuit can both be mounted with the deflection yoke assembly on a neck portion of the cathode-ray tube of the video display apparatus. This simplifies assembly of the video display apparatus because it obviates the need to run wires from the chassis of the video display apparatus to the vertical deflection circuit and the raster centering circuit.

The above, and other features, aspects, and advantages of the present invention will become apparent from the following description read in conjunction with the accompanying drawings, in which like reference numerals designate the same elements.

DESCRIPTION OF THE PREFERRED EMBODIMENTS

Figure 2:
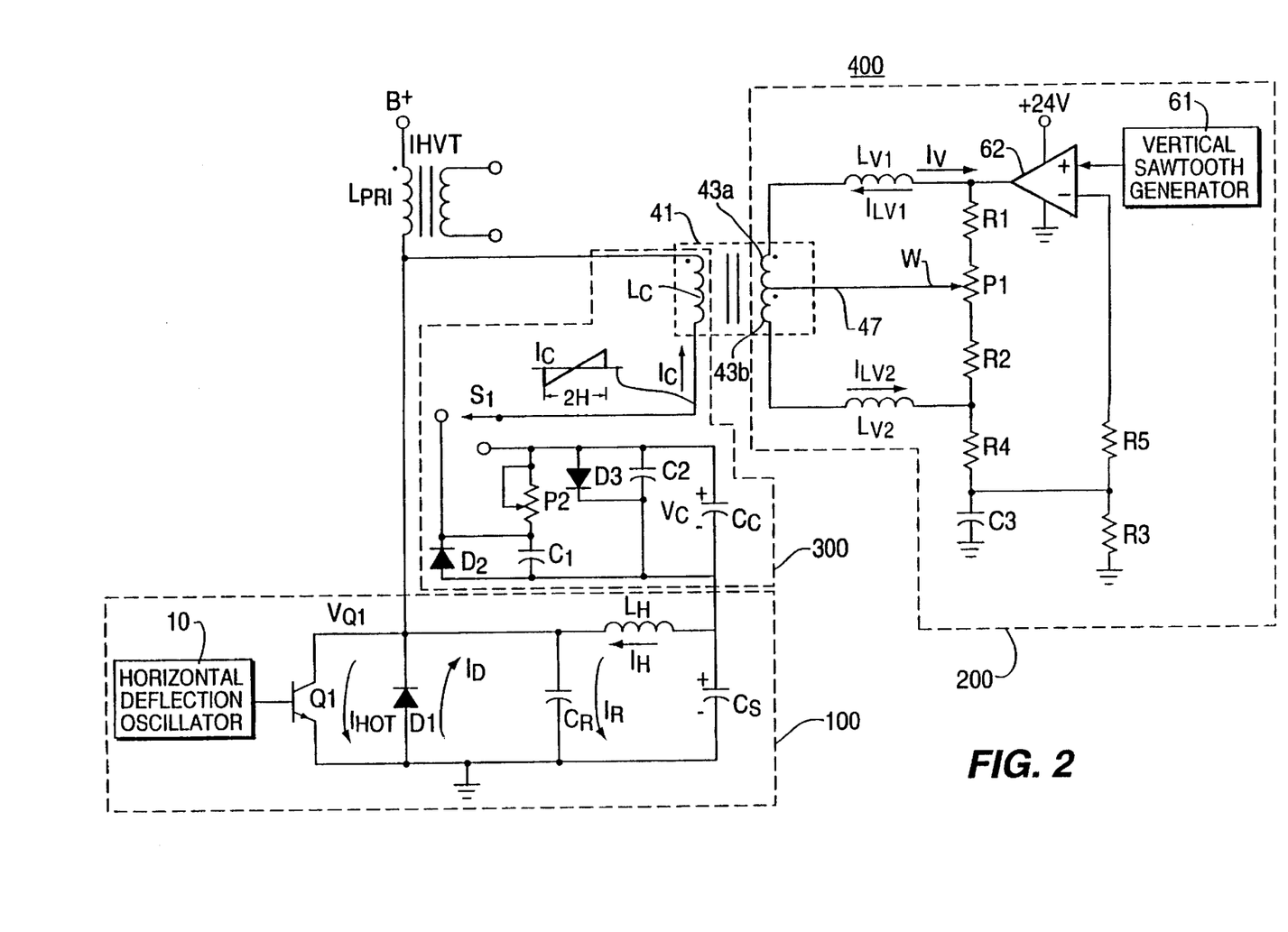
FIGS. 2 and 3 show diagrams, in block and schematic form, of deflection systems for video display apparatus according to inventive arrangements described herein.

An inventive embodiment of a deflection system 400 for a video display apparatus, such as a television receiver or a video display monitor, is shown in FIG. 2. A horizontal deflection circuit 100 and a vertical deflection circuit 200 cooperatively deflect a scanning electron beam to form a raster on a screen of the video display apparatus. The horizontal deflection circuit 100 deflects the scanning electron beam across the screen at a horizontal scanning rate. Simultaneously, the vertical deflection circuit 200 deflects the electron beam downwardly at a slower, vertical scanning rate. A raster centering circuit 300 derives energy from the horizontal deflection circuit 100 in order to horizontally center the scanned raster on the screen of the video display apparatus. In order to consolidate circuitry within the video display apparatus, the vertical deflection circuit 200 advantageously uses a horizontal centering inductor $L_C$ of the raster centering circuit 300 as a primary winding of a raster correction transformer 41.

The embodiments described herein employ horizontal deflection, or scanning, rates equal to approximately 31,468

Hz, commonly referred to as the "2H" scanning frequency. It will become apparent to those skilled in the art that the inventive arrangements described herein are not limited to any particular horizontal or vertical deflection frequencies, but can be utilized throughout the entire range of useful horizontal and vertical deflection frequencies.

Voltage and current waveforms associated with the horizontal deflection circuit 100 are shown in FIGS. 4a–4f; current flow is defined as positive in the directions indicated in FIG. 2. Referring to FIG. 2, a B+ voltage of approximately 140 $V_{dc}$ is impressed across an S-correction capacitor $C_S$ through a primary winding $L_{PRI}$ of a high-voltage transformer IHVT. As an electron beam is deflected to an upper left-hand corner of the raster, a horizontal output transistor Q1 does not conduct a current. Energy previously stored in a horizontal deflection coil $L_H$ causes a current to flow through a forward-biased damper diode D1 and the horizontal deflection coil $L_H$ and into the S-correction capacitor $C_S$. At this point both a damper current $I_D$ and a horizontal deflection current $I_H$ attain their peak negative values.

When the scanning electron beam reaches the center of the raster, the energy stored in the horizontal deflection coil $L_H$ has decayed to zero and the horizontal deflection current $I_H$ and the damper current $I_D$ are equal to approximately zero. The damper diode D1 becomes reverse biased and a horizontal deflection oscillator 10 causes the horizontal output transistor Q1 to conduct a current $I_{HOT}$. The horizontal deflection current $I_H$ reverses direction, and energy supplied to the horizontal deflection coil $L_H$ by the S-correction capacitor $C_S$ allows the horizontal deflection current $I_H$ to increase linearly.

When the scanning electron beam reaches the right edge of the raster, the horizontal deflection oscillator 10 causes the horizontal output transistor Q1 to discontinue conducting the current $I_{HOT}$ and the damper diode D1 remains reverse biased. During this retrace interval, the decaying horizontal deflection current $I_H$ flows rapidly into the retrace capacitor $C_R$. When horizontal deflection current $I_H$ decays to approximately zero, it reverses direction and is then supplied by retrace capacitor $C_R$. Once the retrace capacitor $C_R$ has discharged its stored energy through the horizontal deflection coil $L_H$, the electron beam has been returned to the upper left-hand corner of the raster, and the process repeats.

In the vertical deflection circuit 200 shown in FIG. 2, a vertical-rate sawtooth generator 61 provides a vertical-rate sawtooth waveform to a non-inverting input of a vertical output amplifier 62. The vertical output amplifier 62 is coupled to a positive supply voltage, for example +24 V, and a negative supply voltage, for example a ground potential, and may comprise a complementary or quasi-complementary push-pull transistor output stage. The vertical output amplifier 62 drives first and second vertical deflection windings $L_{V1}$ and $L_{V2}$ of a vertical deflection coil with a vertical-rate sawtooth current $I_V$. The vertical deflection windings $L_{V1}$ and $L_{V2}$ are coupled in a series arrangement; the current flowing through these windings may have a peak-to-peak amplitude equal to approximately 2 A. A voltage divider formed by resistors R3 and R4 generates a feedback voltage, which is coupled to the inverting input of the vertical output amplifier 62 through a resistor R5. A capacitor C3 provides S correction for the vertical deflection current $I_V$.

A series arrangement of resistors R1 and R2 and a potentiometer P1 is coupled in parallel with the two vertical deflection windings $L_{V1}$ and $L_{V2}$. The resistors R1 and R2 and the potentiometer P1 are selected during the design of a deflection yoke for the cathode-ray tube, and these resistances are included as part of a deflection yoke assembly. The three resistances are used to adjust the convergence of the electron beams within the cathode-ray tube. The potentiometer P1 is adjusted to achieve a desired crossover of the electron beams from the outer electron guns, typically red and blue, at a vertical center line of the cathode-ray tube.

Figure 3:
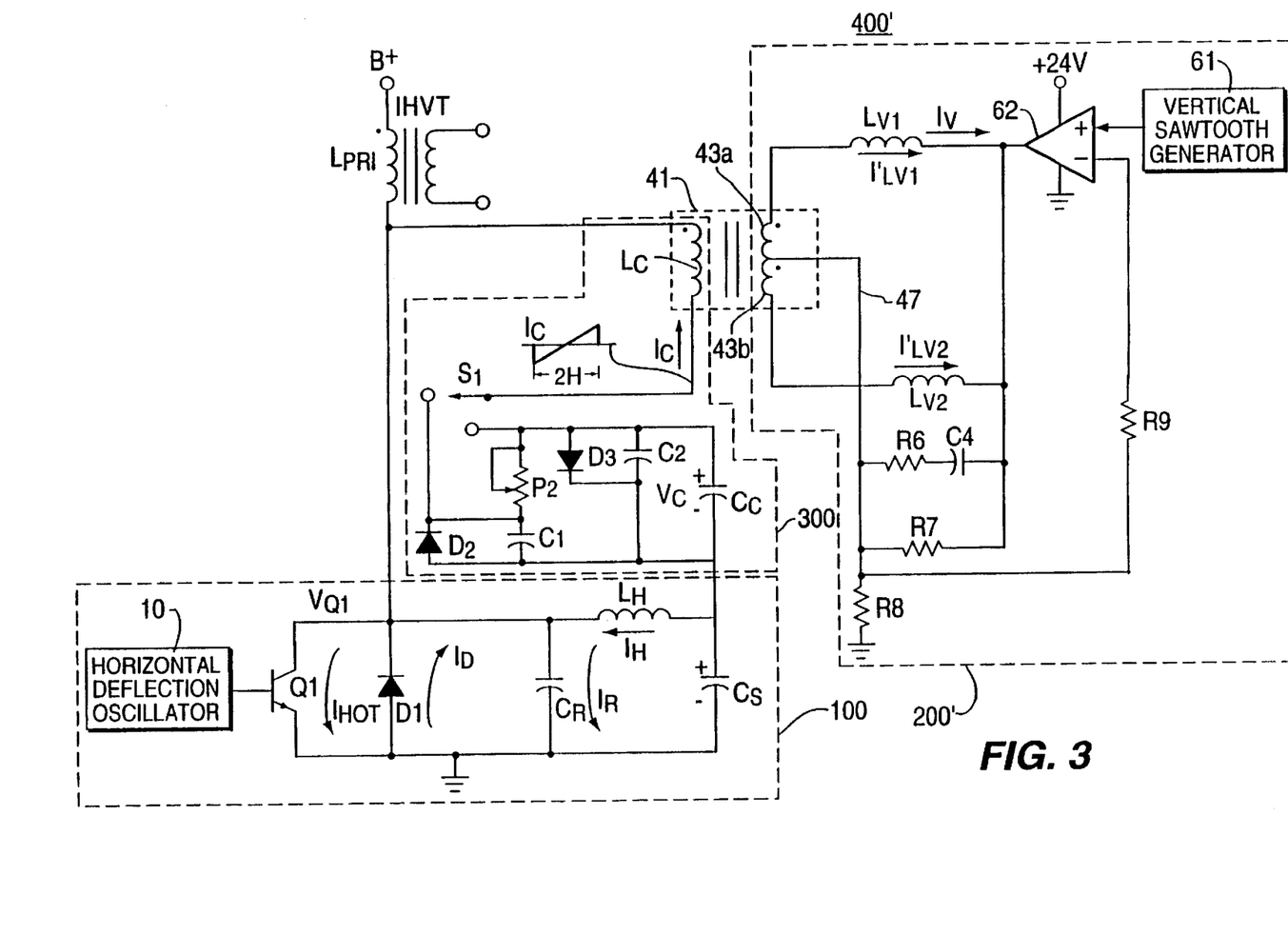

In a presently preferred embodiment of an inventive arrangement described herein the horizontal deflection circuit 100 combines with a vertical deflection circuit 200' to form a deflection system 400', which is shown in FIG. 3. In the vertical deflection circuit 200', the vertical deflection windings $L_{V1}$ and $L_{V2}$ are coupled in a shunt arrangement; the shunt arrangement is advantageously used in order to obtain a shorter vertical retrace time and to enable a lower inductance for the vertical deflection coil for the same applied voltage. The coupling of the secondary winding of transformer 41 to the first and second vertical deflection windings $L_{V1}$ and $L_{V2}$ does not disturb the shunt nature of the arrangement of the vertical deflection windings $L_{V1}$ and $L_{V2}$. The peak-to-peak amplitude of currents $I'_{LV1}$ and $I'_{LV2}$ flowing through each of the vertical deflection windings may have a peak-to-peak amplitude equal to approximately 2 A. A feedback voltage is generated across a resistor R8 and is coupled to the inverting input of the vertical output amplifier 62 by a resistor R9. Resistors R6 and R7 and a capacitor C4 provide a damping network for the deflection windings $L_{V1}$ and $L_{V2}$.

The raster centering circuit 300 of FIGS. 2 and 3 comprises a horizontal centering inductor $L_C$, a centering capacitor $C_C$, diodes D2 and D3, a switch device S1, and a variable resistance P2, which may comprise a potentiometer. The horizontal centering inductor $L_C$ has, for example, N1 turns and typically has a greater inductance, and hence conducts a lower peak-to-peak current, than does the horizontal deflection coil $L_H$. The switch device S1 may comprise, for example, a slide switch or a single-pole, double-throw rotary switch of the type disclosed in U.S. Pat. No. 4,703,233, issued on Oct. 27, 1987, to E. Rodriguez-Cavazos.

Figure 5:
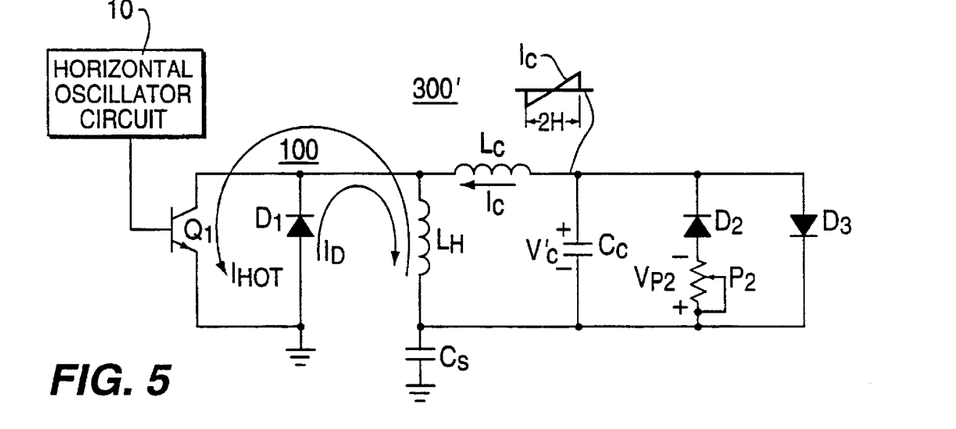
FIG. 5 is a diagram, in block and schematic form, of a first equivalent horizontal centering circuit for the deflection systems of FIGS. 2 and 3.

As shown in FIGS. 2 and 3, the centering circuit 300 derives energy from the horizontal deflection circuit 100. For purposes of the present description, the switch device S1 makes a connection with the anode of the diode D3 to provide an equivalent centering circuit 300', which is shown in FIG. 5. Referring to FIG. 5, during a negative portion of the horizontal deflection current $I_H$, which corresponds to the flow of the damper current $I_D$ through the horizontal deflection coil $L_H$, and, thus, to deflection of the electron beam from the left edge to the center of the raster, the diode D2 is reverse biased, the diode D3 is forward biased, and the horizontal-rate centering current $I_C$ charges the S-correction capacitor $C_S$ through the diode D3. A small, positive centering voltage $V'_C$, clamped to approximately the sum of the forward voltage drop of the diode D3, is established across the centering capacitor $C_C$, as shown in FIG. 6, and a negative portion of the horizontal-rate centering current $I_C$ flows through the horizontal centering inductor $L_C$.

As the electron beam reaches the center of the raster, the horizontal deflection current $I_H$ reverses direction and becomes positive, which corresponds to the flow of the current $I_{HOT}$ through the horizontal deflection coil $L_H$ and, thus, to deflection of the electron beam from the center to the right edge of the raster. The horizontal-rate centering current $I_C$ also becomes positive. The diode D2 is now forward biased, the diode D3 is now reverse biased, and a horizontal-rate current flows through the diode D2 and the variable resistance P2. The centering voltage $V'_C$ becomes negative, as shown in FIG. 6, and is equal to approximately the voltage $V_{P2}$ generated across the variable resistance P2.

Figure 6:
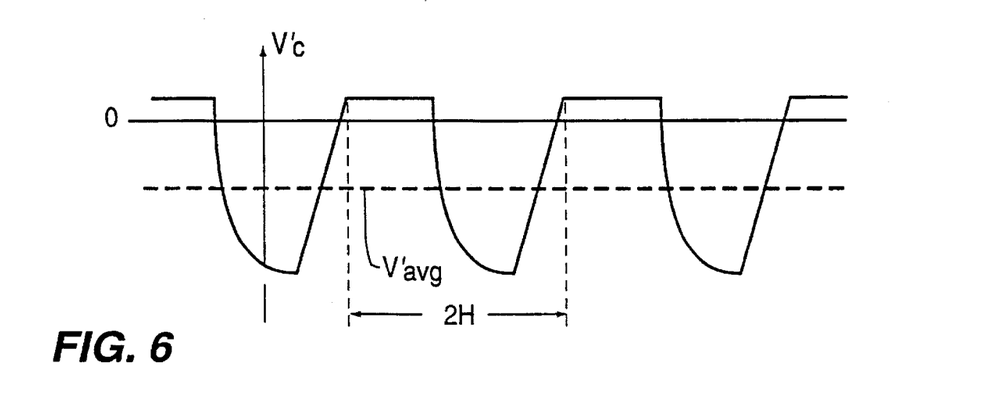
FIG. 6 shows a voltage waveform characteristic of the equivalent centering circuit of FIG. 5.

The successive magnitudes of the negative peaks of the centering voltage $V'_C$ produce an average voltage $V'_{avg}$, as shown in FIG. 6. The voltage $V'_{avg}$ generates a positive component of the horizontal-rate centering current $I_C$ flowing through the horizontal centering inductor $L_C$.

Figure 7:
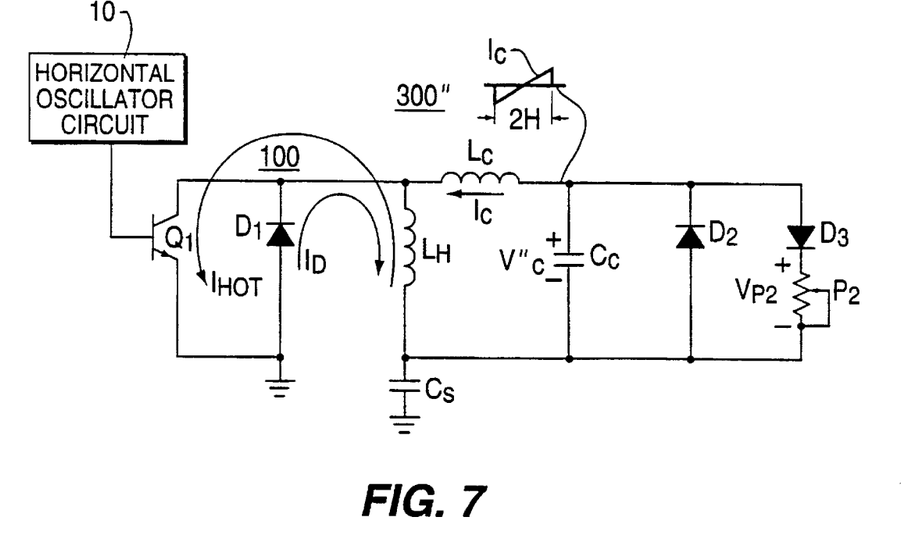
FIG. 7 is a diagram, in block and schematic form, of a second equivalent horizontal centering circuit for the deflection systems of FIGS. 2 and 3.

Setting the switch device S1 to make its connection to the anode of the diode D3 may prove to be inadequate to center the raster properly on the face of the cathode-ray tube. In that event, the switch device S1 is adjusted to make its connection to the cathode of the diode D1 to provide an equivalent centering circuit 300", which is shown in FIG. 7. The circuit of FIG. 7 operates similarly to the circuit of FIG. 5, with the exception that the voltages provided across the centering capacitor $C_C$ in the two circuits have opposite polarities.

Referring to FIG. 7, during a negative portion of the horizontal deflection current $I_H$, which corresponds to the flow of the damper current $I_D$ through the horizontal deflection coil $L_H$ and, thus, to deflection of the electron beam from the left edge to the center of the raster, a negative portion of the horizontal-rate centering current $I_C$ flows through the horizontal centering inductor $L_C$. The diode D2 is reverse biased, the diode D3 is forward biased, and the horizontal-rate centering current $I_C$ charges the S-correction capacitor $C_S$ through the variable resistance P2 and the diode D3. A positive centering voltage $V''_C$ is established across centering capacitor $C_C$, as shown in FIG. 8, and is equal to approximately the voltage $V_{P2}$ generated across the variable resistance P2.

Figure 8:
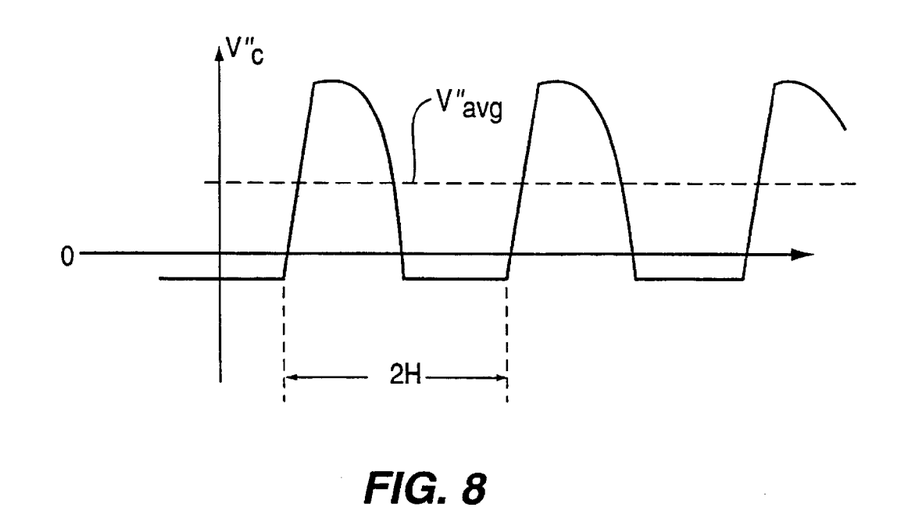
FIG. 8 shows a voltage waveform characteristic of the equivalent horizontal centering circuit of FIG. 7.

The successive magnitudes of the positive peaks of the centering voltage $V''_C$ produce an average voltage $V''_{avg}$, which is shown in FIG. 8. The voltage $V''_{avg}$ generates the horizontal-rate centering current $I_C$ through the horizontal deflection coil $L_H$ in the same direction as the damper current $I_D$.

As the electron beam reaches the center of the raster, the horizontal deflection current $I_H$ reverses direction and becomes positive, which corresponds to the flow of the current $I_{HOT}$ through the horizontal deflection coil $L_H$ and, thus, to deflection of the electron beam from the center to the right edge of the raster. The horizontal-rate centering current $I_C$ also becomes positive. The diode D2 is now forward biased, the diode D3 is now reverse biased, and a horizontal-rate current flows through the diode D2. The centering voltage $V''_C$ becomes negative, as shown in FIG. 8, and is clamped to approximately the sum of the forward voltage drop of diode D2.

In accordance with an inventive arrangement described herein, the deflection systems 400 and 400' shown in FIGS. 2 and 3, respectively, advantageously use the horizontal centering inductor $L_C$ of the raster centering circuit 300 as the primary winding of the raster correction transformer 41. In the presently preferred embodiment shown in FIG. 3, the horizontal centering inductor $L_C$ has 380 turns. The secondary winding of the transformer 41 is coupled in series with the first and second vertical deflection windings $L_{V1}$ and $L_{V2}$ and has 16 turns. A center-tap 47 divides the secondary winding into a first winding 43a and a second winding 43b, each of which has 8 turns. The particular number of primary and secondary turns of the raster correction transformer 41, and hence its turns ratio, is dependent upon the requirements of a particular deflection system and is left to the judgment of one skilled in the art.

Both the horizontal centering inductor $L_C$ and the first and second windings 43a and 43b are advantageously wound around the same core, for example a ferrite rod core which, in a presently preferred embodiment, has a diameter of approximately 0.399 inches and a length of approximately 1 inch. The use of a rod core is illustrative, and is not intended to suggest that a core configuration which has a closed-loop magnetic path length, for example a toroid, cannot be used. A significant factor for one skilled in the art to take into account when selecting a particular core is the need to avoid saturating the core with the horizontal rate centering current $I_C$ flowing through the horizontal centering inductor $L_C$ and with vertical currents $I_{LV1}$ and $I_{LV2}$ (in a series arrangement) and $I'_{LV1}$ and $I'_{LV2}$ (in a shunt arrangement) flowing through the first and second vertical deflection windings $L_{V1}$ and $L_{V2}$; such saturation can cause undesirable distortions in the parallelogram correction currents.

It is advantageous to use the horizontal centering inductor $L_C$ as the primary winding of the raster correction transformer 41 because then the vertical deflection circuit 200 or 200' and the raster centering circuit 300 can both be mounted with the deflection yoke assembly on a neck portion of the cathode-ray tube of the video display apparatus. This simplifies assembly of the video display apparatus because it obviates the need to run wires from the chassis of the video display apparatus to the vertical deflection circuit 200 or 200' and the raster centering circuit 300.

Figure 4A:
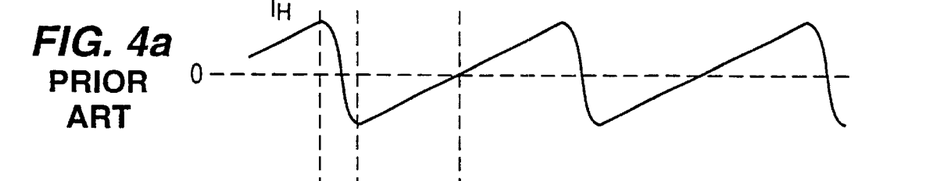
FIGS. 4a–4f shows voltage and current waveforms useful for explaining the operation of the deflection systems of FIGS. 2 and 3.
Figure 4B:
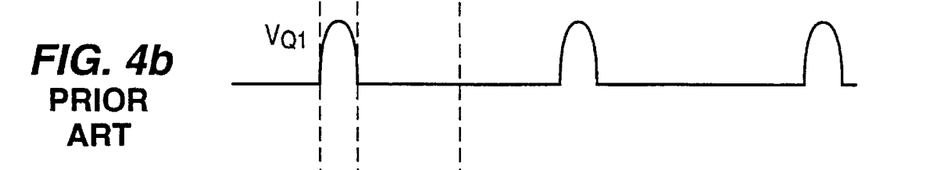
Figure 4C:
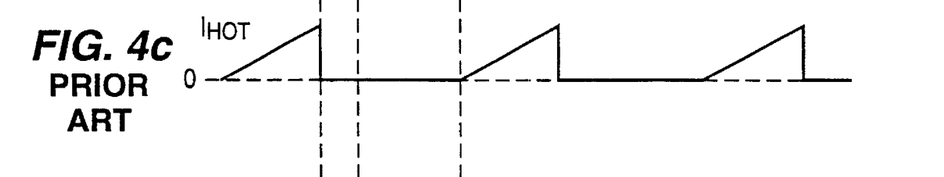
Figure 4D:
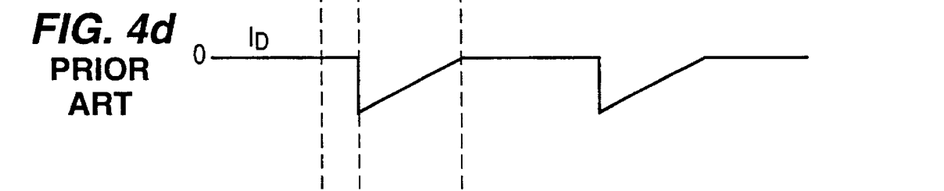
Figure 4E:
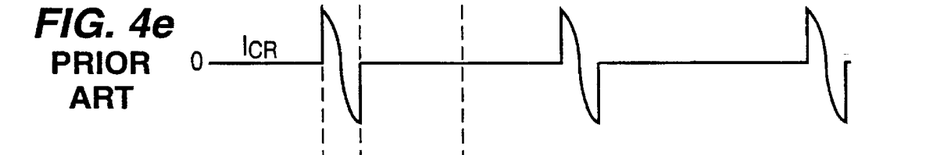
Figure 4F:
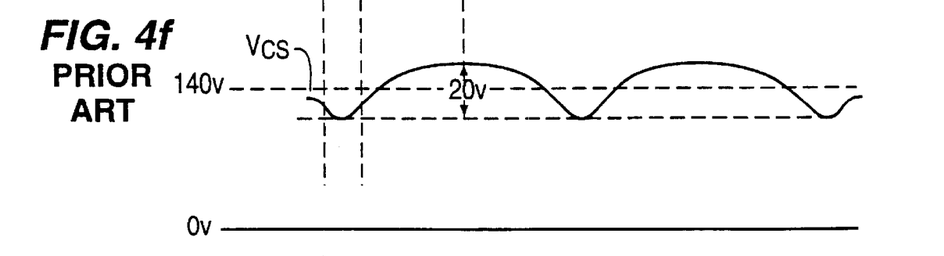

In the embodiments shown in FIGS. 2 and 3, the horizontal deflection circuit 100 generates a horizontal deflection voltage $V_{Q1}$, which is shown as FIG. 4b and typically has a peak-to-peak voltage which is approximately equal to 1200 V. The horizontal deflection voltage $V_{Q1}$ is stepped down in accordance with the turns ratio of raster correction transformer 41, which is equal to $N_2/N_1$. The resulting stepped-down, horizontal-rate pulse waveform is divided substantially equally between the first and second windings 43a and 43b. For example, in the presently preferred embodiment of FIG. 3, the stepped-down horizontal-rate pulse waveform has a peak-to-peak voltage of approximately 28 V and is divided substantially equally across first and second windings 43a and 43b of secondary winding 43. Thus, first and second windings 43a and 43b are each provided with a horizontal-rate pulse waveform which has a peak-to-peak voltage of approximately 14 V.

Returning to the deflection system 400 of FIG. 2, the stepped-down horizontal-rate pulse waveforms across the first and second windings 43a and 43b induce the horizontal-rate raster correction currents $I_{LV1}$ and $I_{LV2}$, respectively, for the first and second vertical deflection windings $L_{V1}$ and $L_{V2}$. The raster correction currents $I_{LV1}$ and $I_{LV2}$ are not constrained to have equal peak-to-peak amplitudes by virtue of the center-tap 47. In addition, the peak-to-peak amplitudes of the raster correction currents $I_{LV1}$ and $I_{LV2}$ may vary as the coupling between the horizontal centering inductor $L_C$ and the secondary winding of transformer 41 changes for different choices of the ferrite core.

Figure 9:
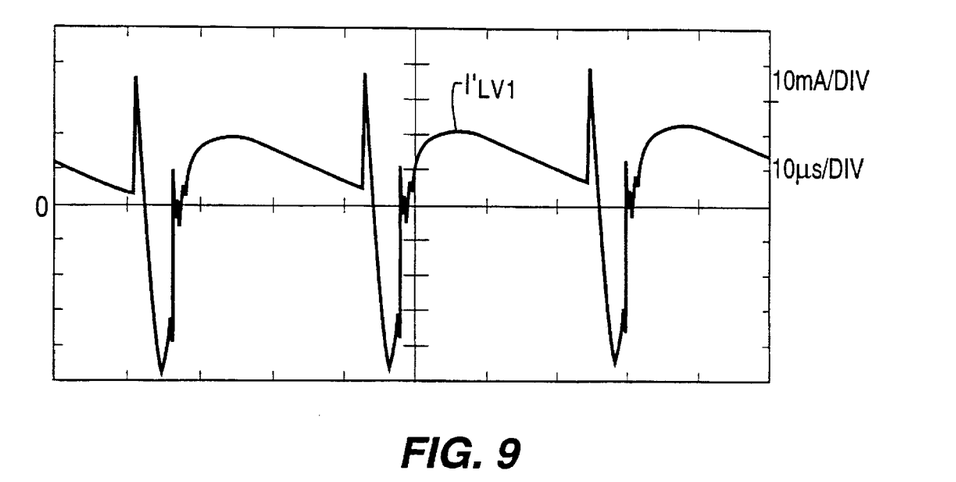
FIGS. 9 and 10 show current waveforms characteristic of the deflection system of FIG. 3.
Figure 10:
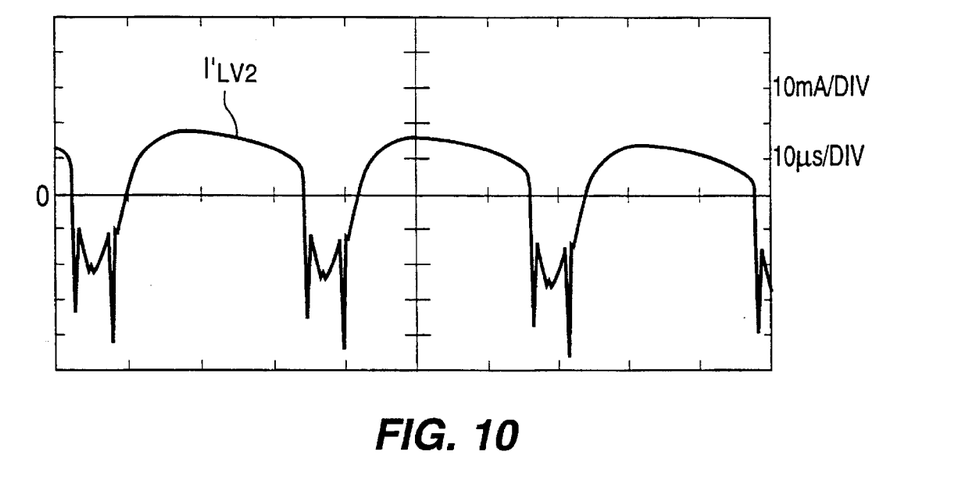

In the deflection system 400' of FIG. 3, the stepped-down horizontal-rate pulse waveforms across the first and second windings 43a and 43b induce the horizontal-rate raster correction currents $I'_{LV1}$ and $I'_{LV2}$, as shown in FIGS. 9 and 10. The raster correction currents $I'_{LV1}$ and $I'_{LV2}$ are not constrained to have equal peak-to-peak amplitudes by virtue of the shunt arrangement of windings $L_{V1}$ and $L_{V2}$. In addition, the peak-to-peak amplitudes of the raster correction currents $I'_{LV1}$ and $I'_{LV2}$ may vary as the coupling between the horizontal centering inductor $L_C$ and the secondary winding 43 changes for different choices of the ferrite core.

The raster correction currents $I_{LV1}$ and $I_{LV2}$ (in a series arrangement) and $I'_{LV1}$ and $I'_{LV2}$ (in a shunt arrangement)

flow through the first and second vertical deflection windings $L_{V1}$ and $L_{V2}$, respectively, in a direction such that a magnetic field is created which opposes the downhill scan effect. In this way the vertical deflection current is modulated at a horizontal rate and the downhill scan effect is substantially offset for each horizontal scanning line of the raster.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A deflection system for forming a raster on a screen of a video display apparatus, said deflection system comprising:
   a vertical deflection coil for deflecting said scanning electron beam between first and second edges of said raster;
   a raster centering circuit for centering said raster on said screen, said centering circuit comprising a centering inductance; and
   a raster correction transformer having said centering inductance for a primary winding and a secondary winding coupled to said vertical deflection coil.

2. The deflection system of claim 1, wherein said vertical deflection coil comprises first and second vertical deflection windings.

3. The deflection system of claim 2, wherein said first and second vertical deflection windings are coupled in a series arrangement.

4. The deflection system of claim 2, wherein said first and second vertical deflection windings are coupled in a shunt arrangement.

5. The deflection system of claim 2, wherein said secondary winding is coupled in series with said first and second vertical deflection windings.

6. The deflection system of claim 5, further comprising a series interconnection of a plurality of resistances wherein one of said plurality has a terminal coupled to one of said vertical deflection windings and another of said plurality has a terminal coupled to the other of said vertical deflection windings.

7. The deflection system of claim 6, wherein one of said plurality of resistances comprises a potentiometer.

8. The deflection system of claim 7, wherein:
   said secondary winding comprises a center-tap; and
   said center-tap is coupled to a wiper of said potentiometer.

* * * * *